United States Patent
Sherman et al.

(10) Patent No.: US 11,652,680 B1
(45) Date of Patent: May 16, 2023

(54) WAVEFORM INDEPENDENT COARSE SYNCHRONIZATION METHOD

(71) Applicant: BAE Systems Information and Electronic Systems Integration Inc., Nashua, NH (US)

(72) Inventors: Matthew J. Sherman, Succasunna, NJ (US); Bassem Scander, Monroe, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 221 days.

(21) Appl. No.: 17/346,935

(22) Filed: Jun. 14, 2021

(51) Int. Cl.
*H04L 27/26* (2006.01)
*G01S 13/02* (2006.01)

(52) U.S. Cl.
CPC .... *H04L 27/2663* (2013.01); *H04L 27/26524* (2021.01); *G01S 2013/0281* (2013.01)

(58) Field of Classification Search
None
See application file for complete search history.

(56) References Cited

U.S. PATENT DOCUMENTS

| | | | | |
|---|---|---|---|---|
| 8,315,327 B2* | 11/2012 | Agee | ...................... | H04L 5/0007 375/267 |
| 8,351,534 B2* | 1/2013 | Mussmann | .......... | H04B 7/0857 375/267 |
| 2011/0013487 A1* | 1/2011 | Zhou | ...................... | H04B 11/00 367/134 |
| 2012/0170680 A1 | 7/2012 | Stern | | |
| 2015/0029962 A1 | 1/2015 | Yun et al. | | |
| 2015/0156242 A1 | 6/2015 | Hwang et al. | | |
| 2020/0178121 A1 | 6/2020 | Simon et al. | | |

OTHER PUBLICATIONS

International Search Report, PCT/US22/33373, dated Sep. 7, 2022, 10 pages.
BAE Systems, Communiciations Under Extreme RF Spectrum Conditions, www.baesystems.com.
Haigh, et al., Parallel Learning and Decision Making for a Smart Embedded Communications Platform, Raytheon BBN Technologies, BBN Report-8579, 2015.
Haigh, Learning to Optimize a Network Overlay Router, Distribution Statement "A", Raytheon BBN Technologies, 2017.
Mody, et al., On Making the Current Military Radios Cognitive without Hardware of Firmware Modifications, BAE Systems, Technology Solutions, US Army CERDEC, S&TCD Seams.
Zeng, et al., From Spectrum Agility to Network Agility: Proactive and Adaptive Reconfiguration for Reliable Communiciation in Tactical Networks, Intelligent Automatic, Inc., BAE systems, US Army CERDEC.

* cited by examiner

*Primary Examiner* — Diane L Lo
(74) *Attorney, Agent, or Firm* — Sand, Sebolt & Wernow LPA

(57) ABSTRACT

A wideband chaotic waveform that is rateless in that it may be modulated at virtually any rate and has a minimum of features introduced into the waveform. Further, the waveform provided may be operated below a signal to noise ratio wall to further enhance the LPD and LPE aspects, thereof. Additionally, the present disclosure may provide a mix of coherent and non-coherent processing techniques applied to signal samples to efficiently achieve coarse synchronization with a waveform that is faster, more efficient and more accurate than using time domain signal correlators alone.

19 Claims, 7 Drawing Sheets

WAVEFORM INDEPENDENT COARSE SYNCHRONIZATION METHOD

TECHNICAL FIELD

The present disclosure relates generally to low probability of detection and low probability of exploitation communications. More particularly, in one example, the present disclosure relates to methods of waveform generation and waveform synchronization for use with low probability of detection and low probability of exploitation communications. Specifically, in another example, the present disclosure relates to methods of generation for wideband, featureless, and rateless chaotic waveforms and to methods of waveform coarse synchronization without regard to the type of waveform being synchronized.

BACKGROUND

Radio communications, particularly those used in military operations taking place in contested or hostile environments, are often vital to the success of such operations. Such communications may be used locally, for example, to coordinate troop positions or movements as well as to relay and/or exfiltrate information out to or from a remote location such as a base of operations or command center. Each of these specific types of communications may have different requirements relating to power, frequency, or the like. Similarly, these communications may have different requirements and/or objectives depending on the particulars of the mission or operation at hand.

As these battlefield communications are usually vital to the mission and/or to the safety of the mission participants, adversaries in the area of operations may look to exploit such communications to determine information about their opponent. For example, adversaries may use the existence of communication signals to determine information such as the location, movement, and/or type of vehicle or unit deployed. Further, hostile adversaries may use this information for offensive or defensive measures, such as for missile guidance or the like. Accordingly, it is desirable to utilize low probability of detection (LPD) and/or low probability of exploitation (LPE) communications to thwart such uses of these communications signals. As adversarial sensor capabilities improve, these LPD/LPE technologies become more important; however, they typically come at the cost of reduced throughput, which may further impact mission effectiveness. It is therefore increasingly important to operate or generate LPD/LPE signals to evade even the most advanced detectors.

Current detectors tend to operate under principles of energy detection, waveform feature detection, and/or signal rate detection. While these are not the limit of the types of detectors that exist, energy detectors are the most basic and most common detector currently in use. The basic principle of operation for energy detectors is to monitor or "listen" for signals across the electromagnetic spectrum (or particular frequency bands thereof). Energy detectors are capable of near continuous operation if desired and the longer these detectors "listen" the more likely they are to detect a signal. Thus, if they "listen" long enough, these detectors will theoretically always detect any signal generated at a finite rate. Thus, according to information theory, LPD is impossible given a long enough integration time.

Accordingly, if a signal is generated that can avoid detection by an energy detector with a sufficiently long integration time, that same signal will avoid all other types of detection and/or minimize the probability of detection by other types of detectors based on not being discovered in the first place. In other words, if the energy detectors can't determine a signal is there, other detectors focused on certain aspects of that signal (e.g. rate, features, etc.) won't know where to look to find that signal either.

One method, discussed further below, that may be useful for LPD/LPE communications involves the use of a cognitive system utilizing a reasoning element to allow for dynamic changes to mission parameters and mission communications in real time. One such example with common inventorship hereto may be found in U.S. patent application Ser. No. 16/804,104, filed Feb. 28, 2020, the disclosure of which is incorporated by reference as if rewritten herein.

Such solutions may utilize a cognitive radio system having a strategy optimizing component as a reasoner utilizing gain theory to reason over a set of policy constraints over the system. These constraints may control the actions of the radio system utilized in LPD/LPE communications and may include determinations relating to aspects such as frequency bands relative to time, placement, and/or direction of the transmission of data, range and position of enemy detectors, and/or range and position of the transmitting unit relative to receiving units. While such systems may enable LPD/LPE communications to occur, the form, or more particularly, the waveform of those communications may still be detectable in certain scenarios, such as instances where the detector is more advanced or more agile.

Other LPD/LPE systems tend to rely on spread spectrum techniques to introduce features into the waveform to reduce detectability. However, these introduced features may still permit some level of detectability for the waveform by some particular detectors. Alternatively, chaotic waveforms may be employed; however, they tend to be more narrowly banded and commonly "hop" to fully utilize the width of the spectrum. Such hopping may likewise introduce features into the waveform, which again may permit some level of detectability therefor. Similarly, current chaotic waveforms often operate at a limited number of data rates, which again may increase the detectability thereof.

Additional issues exist for LPD/LPE waveforms, particularly relating to the synchronization of a receiver with a transmitted waveform. In particular, as waveforms evolve and become more complex to avoid detection, their effectiveness as communications signals may suffer due to synchronization difficulties on the receiving end. Put another way, even if your signal is not detectable by adverse receivers, the signal is of little to no value if it cannot be synchronized and received coherently by your target receiver.

Signal synchronization poses a particularly difficult challenge when specific characteristics of the signal such as modulation and coding are not known. In other instances, the channel between the signal source and signal receiver may distort the waveform in various ways, including unknown time and frequency shifts. In both of these cases, it becomes necessary to efficiently search time and frequency spaces for the waveform (typically done using a time domain signal correlator) to correctly identify the time and frequency parameters of the channel. Only then can the receiver be synchronized with the waveform. Often, this initial degree of synchronization is less accurate than as typically required to fully process the received waveform.

Thus, it is difficult to efficiently achieve coarse synchronization of a LPD/LPE waveform with a given set of time and frequency samples. Further, other effects, such as wideband Doppler, may cause distortion during reception of the signal samples that may further limit the effectiveness of a time domain signal correlator.

SUMMARY

The present disclosure addresses these and other issues by providing a wideband chaotic waveform that is rateless in that it may be modulated at virtually any rate, has a continually varying rate, and has a minimum of features introduced into the waveform. Further, the waveform provided may be operated below a signal to noise ratio wall to further enhance the LPD and LPE aspects, thereof.

Additionally, the present disclosure addresses these issues through a mix of coherent and non-coherent processing techniques applied to signal samples to efficiently achieve coarse synchronization with a waveform that is faster, more efficient and more accurate than using time domain signal correlators alone.

In one aspect, an exemplary embodiment of the present disclosure may provide a method of waveform synchronization comprising: receiving a signal via at least one antenna and at least one receiver, the signal having a known preamble and wherein the data used in generating the signal are not known except for the data symbols in the preamble; creating a plurality of coherence domains using time and frequency constraints to accept maximum uncompensated Doppler values; establishing a plurality of FFT bins in each of plurality of coherence domains; performing a series of bulk correlations on the received signal by multiplying the received signals with a reference signal derived from the known preamble in the frequency domain and applying an inverse fast Fourier transform (FFT) to the result to estimate the correlation values at points in time; detecting and isolating the preamble of the received signal; estimating the synchronization values of the received signal within the coherence domains based on the known preamble; estimating the synchronization values of the received signal between coherence domains based on the known preamble; and updating the synchronization values of the received signal on an ongoing and real time basis using the estimated synchronization values from the detected signal from a post processing feedback loop. This exemplary embodiment or another exemplary embodiment may further provide wherein estimating the synchronization values of the received signal within coherence domains is performed using coherent processing techniques. This exemplary embodiment or another exemplary embodiment may further provide wherein estimating the synchronization values of the received signal between coherence domains is performed using non-coherent processing techniques. This exemplary embodiment or another exemplary embodiment may further provide wherein creating the plurality of coherence domains further comprises: calculating a size constraint in the time domain based the highest Doppler frequency of concern determined from a maximum uncompensated velocity between a transmitter generating the detected signal and the receiver. This exemplary embodiment or another exemplary embodiment may further provide wherein the value of the size constraint in the time domain is approximately one quarter of a period of the highest Doppler frequency of concern. This exemplary embodiment or another exemplary embodiment may further provide wherein creating the plurality of coherence domains further comprises: calculating a size constraint in the frequency domain based on a maximum Doppler frequency offset that is less than the FFT bin size determined by a drift limit of less than 180°; and calculating the number of coherence domains required to keep a Doppler skew below 10°. This exemplary embodiment or another exemplary embodiment may further provide wherein the size constraint in the frequency domain is approximately one tenth of the FFT bin size determined by the drift limit. This exemplary embodiment or another exemplary embodiment may further provide wherein creating the plurality of coherence domains further comprises: calculating a number of signal samples to be taken per bin based on the smaller of the size constraint in the time domain and the size constraint in the frequency domain; and sampling the signal. This exemplary embodiment or another exemplary embodiment may further provide wherein establishing the plurality of FFT bins further comprises: selecting an FFT size closest to the number of samples per bin; and determining the number of bins per coherence domain.

In another aspect, an exemplary embodiment of the present disclosure may provide a method of secure communications within an environment comprising: generating a communications signal with at least a portion of the signal being known and at least a portion of the signal being unknown; transmitting the communications signal from a first platform via at least one antenna in operable communication with at least one transmitter; receiving the communications signal with a second platform via at least one antenna in operable communication with at least one receiver; creating a plurality of coherence domains using time and frequency constraints to accept maximum uncompensated Doppler values; establishing a plurality of FFT bins in each of plurality of coherence domains; estimating the synchronization values of the communications signal within the coherence domains based on the known portion of the communications signal; estimating the synchronization values of the received signal between coherence domains based the known portion of the communications signal; and updating the synchronization values of the communications signal on an ongoing and real time basis using the estimated synchronization values from the detected signal from a post processing feedback loop. This exemplary embodiment or another exemplary embodiment may further provide wherein estimating the synchronization values of the received signal within coherence domains is performed using coherent processing techniques. This exemplary embodiment or another exemplary embodiment may further provide wherein estimating the synchronization values of the received signal between coherence domains is performed using non-coherent processing techniques. This exemplary embodiment or another exemplary embodiment may further provide wherein creating the plurality of coherence domains further comprises: calculating a size constraint in the time domain based the highest Doppler frequency of concern determined from a maximum uncompensated velocity between the first platform and the second platform. This exemplary embodiment or another exemplary embodiment may further provide wherein the value of the size constraint in the time domain is approximately one quarter of a period of the highest Doppler frequency of concern. This exemplary embodiment or another exemplary embodiment may further provide wherein creating the plurality of coherence domains further comprises: calculating a size constraint in the frequency domain based on a maximum Doppler frequency offset that is less than the FFT bin size determined by a drift limit of less than 180°; and calculating the number of coherence domains required to keep a Doppler skew below 10°. This exemplary embodiment or another exemplary embodiment may further provide wherein the size constraint in the frequency domain is approximately one tenth of the FFT bin size determined by the drift limit. This exemplary embodiment or another exemplary embodiment may further provide wherein creating the plurality of coherence domains further comprises: calculating a number of signal samples to be taken per bin based on the smaller of the size constraint in the time domain and the size constraint in the frequency domain; and sampling the signal. This exemplary embodiment or another exemplary embodiment may further provide wherein establishing the plurality of FFT bins further comprises: selecting an FFT size closest to the number of samples per bin; and determining the number of bins per coherence domain.

In another aspect, an exemplary embodiment of the present disclosure may provide a system comprising: at least one antenna; at least one receiver in operable communication with the at least one antenna, the at least one antenna and at least one receiver operable to receive and transmit electromagnetic signals; at least one processor capable of executing logical functions in communication with the at least one antenna and at least one receiver; and at least one non-transitory computer readable storage medium having instructions encoded thereon that, when executed by the processor, implements operations to generate a waveform, the instructions including: receive a signal via the at least one antenna and the at least one receiver, the signal having a known preamble and wherein the data used in generating the signal are not known except for the data symbols in the preamble; create a plurality of coherence domains using time and frequency constraints to accept maximum uncompensated Doppler values; establish a plurality of FFT bins in each of plurality of coherence domains; perform a series of bulk correlations on the received signal by multiplying the received signals with a reference signal derived from the known preamble in the frequency domain and applying an inverse fast Fourier transform (FFT) to the result to estimate the correlation values at points in time; detect and isolate the preamble of the received signal; estimate the synchronization values of the received signal within the coherence domains based on the known preamble; estimate the synchronization values of the received signal between coherence domains based on the known preamble; and update the synchronization values of the received signal on an ongoing and real time basis using the estimated synchronization values from the detected signal from a post processing feedback loop.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The methods described herein relate to generation and to synchronization of a waveform for low probability of detection (LPD) and low probability of exploitation (LPE) communications. These methods are described with reference to an example of a radio system as used with a platform; however it will be understood that these methods may be employed with various different radio systems and/or different platforms, as discussed further below. These methods represent an improvement over prior LPD/LPE communications signals in that they enhance and improve both generation and synchronization of a waveform over prior art solutions. Further, these methods increase the operating efficiency and performance of radio systems while further allowing for improvements in LPD/LPE communications through reduced probability of detection, as discussed herein. Accordingly, while, in one instance, these methods may be implemented through the use of existing and/or legacy systems, it will be understood that they represent improvements to the operation and functioning thereof.

As discussed further herein, while the primary focus of this method is LPD/LPE military communications, the same methods may be used by analogy in commercial applications for underlay communication. If there are existing communications in a band, and the receivers of those existing communications have a certain tolerable signal-to-noise ratio (SNR) or spectral flux density (SFD), the methods described here could be used to establish additional communications that do not interfere unacceptably with the existing communications. Those existing communication could be of either a commercial or military nature. The new communications capability established may or may not be required to be LPD/LPI. However they would have the additional requirement of not interfering with existing communications (or other RF functions such as radar) in a given band.

Figure 1:
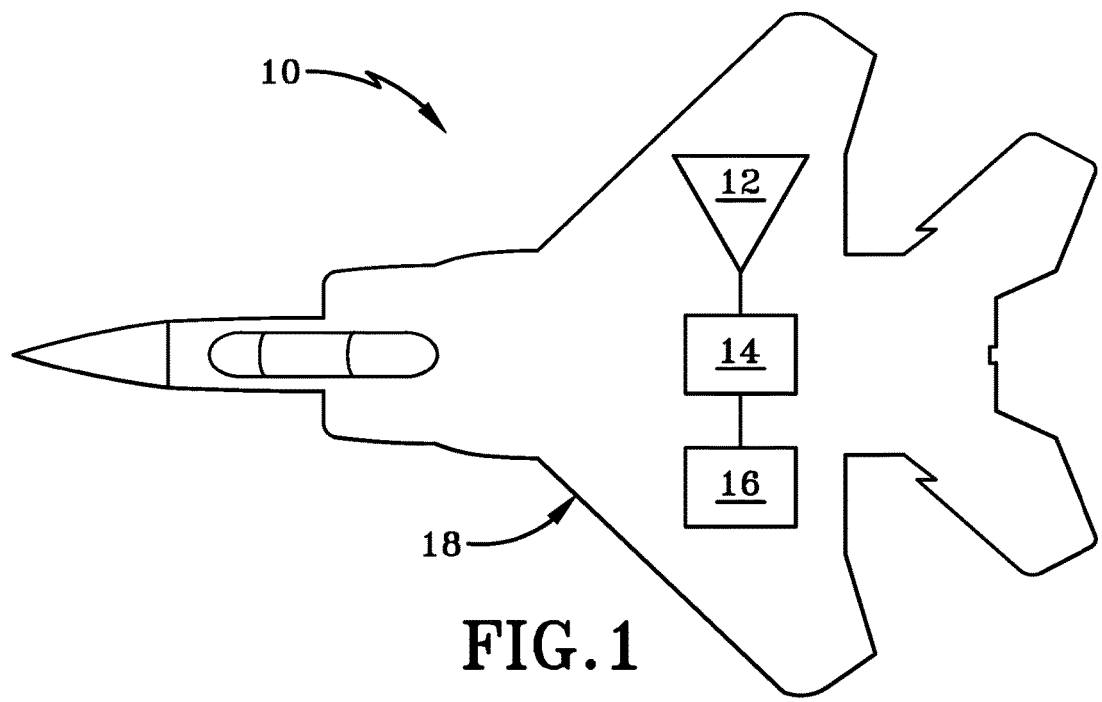
FIG. 1 is a schematic view of a radio system according to one aspect of the present disclosure.

With reference to FIG. 1, a generalized radio system is shown and generally indicated at reference 10. As shown in FIG. 1, a basic representation of radio system 10 may include one or more antennas 12, one or more transceivers 14, and one or more processors 16. As depicted, radio system 10 may be installed on a platform 18, as discussed further below. As a whole, radio system 10 may be any suitable radio system 10 and may include legacy assets therein or may be modified as dictated by the desired implementation. According to one aspect, system 10 may be a radio system 10 as described in U.S. patent application Ser. No. 16/804,104, which has been incorporated herein by the reference above.

As used and understood herein, antenna 12 may be an antenna array, which may include one or more antennas 12 in any configuration and may be installed in any position on platform 18. Antenna 12 may be a monopole, dipole, directional, or omni-directional antennas 12, or may be any combination thereof. Antenna(s) 12 may be arranged in any desired configuration appropriate for the installation conditions, including existing legacy configurations on a platform 18 as dictated by the specific installation parameters and the type of platform 18 used. It will be understood that one particular antenna 12 arrangement may work better for a particular platform 18 with another antenna 12 arrangement being better suited for a different platform 18. By way of one non-limiting example, where platform 18 is an aircraft, it may be better suited for a particular antenna 12 arrangement(s) while a land-based or sea-based vehicle platform 18 may find advantages with a different antenna 12 arrangement(s). According to one aspect, antennas 12 may differ in type by function. For example, as discussed further below, antennas 12 utilized for receiving a signal may be of one type while antennas 12 used for transmitting a signal may be of the same or of a different type.

Antenna(s) 12 may include receiving antennas and transmitting antennas, which may be operable to broadcast and/or receive radio signals directed to and/or from the platform 18 as discussed further herein. According to one aspect, the antennas 12 may be in communication with transceiver 14 and/or processor 16 such that signals received by antennas 12 may be communicated to transceiver 14 and/or processor 16, as discussed further herein. Similarly, signals being generated by processor 16 and/or transceiver 14 may be communicated to and broadcast out from platform 18 via antennas 12. Where multiple antennas 12 are utilized, they may be configured such that all antennas 12 may be of the same type (e.g. dual band, directional, omni-directional, etc. . . . ) or may be configured such that multiple types of antennas 12 may be employed together or in close proximity with each other. According to one example, a radio system 10 may have one antenna 12 or antenna 12 array configured for a first signal, such as a dual band signal while also having antenna(s) 12 configured for a second signal, such as a directional signal.

According to one aspect, system 10 may include full multi-input multi-output (MIMO) functionality. System 10 may therefore further include a dedicated exciter and/or power amplifier for each antenna 12 provided therein. According to another aspect, as discussed previously herein, system 10 may include one or more antenna arrays in place of one or more of the antennas, which may be adaptive antenna arrays. Alternatively, adaptive arrays may be provided in line with one or more antennas 12, as dictated by the desired implementation.

The one or more transceivers 14 may be operable to both transmit and/or receive radio waves via the antennas 12 and may include any type of transmitter, including but not limited to, communications transmitters, radar transmitters, signal jamming transmitters, or the like. According to one aspect, transceiver 14 may include more than one type of transmitter. Transceiver 14 may further include any type of receiver, including but not limited to, radio receivers, global navigation receivers, very high frequency omni-directional range (VOR) receivers, or the like. According to another aspect, transceiver 14 may include more than one type of receiver.

Transceiver 14 may be operable to transmit and/or receive electromagnetic signals via the antennas 12, as discussed further herein. According to another aspect, transceiver 14 may be both a transmitter and a receiver realized as separate assets within the radio system 10 as dictated by the desired implementation parameters.

Transceiver 14 may be in communication with one or more processors 16 through a wired or wireless connection, which may be a direct connection, a direct serial connection, or a wireless connection. According to another aspect, transceiver 14 may be in communication with processor 16 through intermediate components that may be included or otherwise utilized by radio system 10 according to the desired implementation. For example, transceiver 14 may be in communication with processor 16 by way of one or more frequency converters or the like.

The one or more processors 16 may be one or more computer processors, logics or series of logics, including or otherwise in communication with one or more non-transitory storage mediums. The processor 16 may be a digital processor capable of carrying out and executing a set of instructions or processes encoded thereon as further discussed herein. According to one aspect, processor 16 may be operationally connected to other components of radio system 10 as discussed further herein. According to another aspect, processor 16 may be remote from other radio system 10 components and may be in wired, wireless, or in any suitable combination of wired and wireless communication therewith. The connectivity and communication between other radio system 10 components and processor 16 may therefore vary, depending upon the desired implementation and installation parameters of radio system 10 as discussed herein.

Transceiver 14 and/or processor 16 may further be in communication with other systems onboard the platform 18 such that relevant data may be communicated there between. For example, where platform 18 is an aircraft, onboard flight systems may relay the data to the transceiver 14 and/or processor 16 such as heading, altitude, flight speed, geolocation, and the like. Similarly, transceiver 14 and/or processor 16 may communicate data regarding detected signals and the like to the platform 18, including to the operator or operators thereof. As discussed further below, communication between the platform 18 and the radio system 10 may allow specific actions to be taken by platform 18. For example, where platform 18 is an unmanned aircraft such as a drone, platform 18 may take automated actions such as steering towards or away from a specific location to best fit the needs of radio system 10 and any communications being sent therefrom or received thereto. Where platform 18 is a manned platform, such as a manned aircraft, platform 18 may take similar automated responsive action or may alternatively allow the operator or pilot of the platform 18 to choose whether or not to employ responsive actions.

According to one aspect, transceiver 14 and processor 16 may be separate assets within radio system 10. According to another aspect, transceiver 14 and processor may be a single, integrated unit within radio system 10. It will be therefore understood that the illustration of radio system 10 as shown in FIG. 1 is an exemplary view and not a limiting view thereof.

Platform 18 may be any suitable unit which may be capable of operating in a congested environment, a contested environment, or a hostile environment and further capable of utilizing radio communications. According to one aspect, platform 18 may include manned portable radio systems 10 carried by individual troops. According to another aspect, platform 18 may be ground vehicles, sea-based vehicles, aircraft, including manned and unmanned, and the like carrying radio system 10 thereon or therewith.

According to another aspect, platform 18 may be a munition, rocket, or other propelled vehicle. According to another aspect, platform 18 may be a remotely operated vehicle. As used herein, platform 18 is illustrated as an aircraft (such as in FIG. 1); however, the examples and description provided herein will be understood to be equally applicable across all versions of platform 18 as dictated by the desired implementation, unless specifically stated otherwise.

As further used herein, a congested environment is contemplated to be an environment with a high utilization of the electromagnetic spectrum and may include civilian areas or areas that are not considered to include a threat. A contested environment is contemplated to be an environment where adverse or opposing units are operating, scanning, monitoring or otherwise present within an area of operations. A hostile environment, as used herein, is contemplated to be an environment that is contested in a manner such that a threat is posed to platform 18 as it operates in the area of operations. Accordingly, a hostile environment is a contested environment; however, a contested environment may not always be hostile. Both contested and hostile environments may be congested or not congested depending upon the utilization of the electromagnetic spectrum therein.

The area of operations may be referred to herein and collectively as the "theater" and will be understood to include both contested and hostile environments, unless specifically stated otherwise. An adverse unit, enemy, or enemy unit, as used herein, are all contemplated to be any member or unit of an opposing force operating in the same environment, including, but not limited to persons, vehicles, stationary installations, satellites, or the like.

Figure 2:
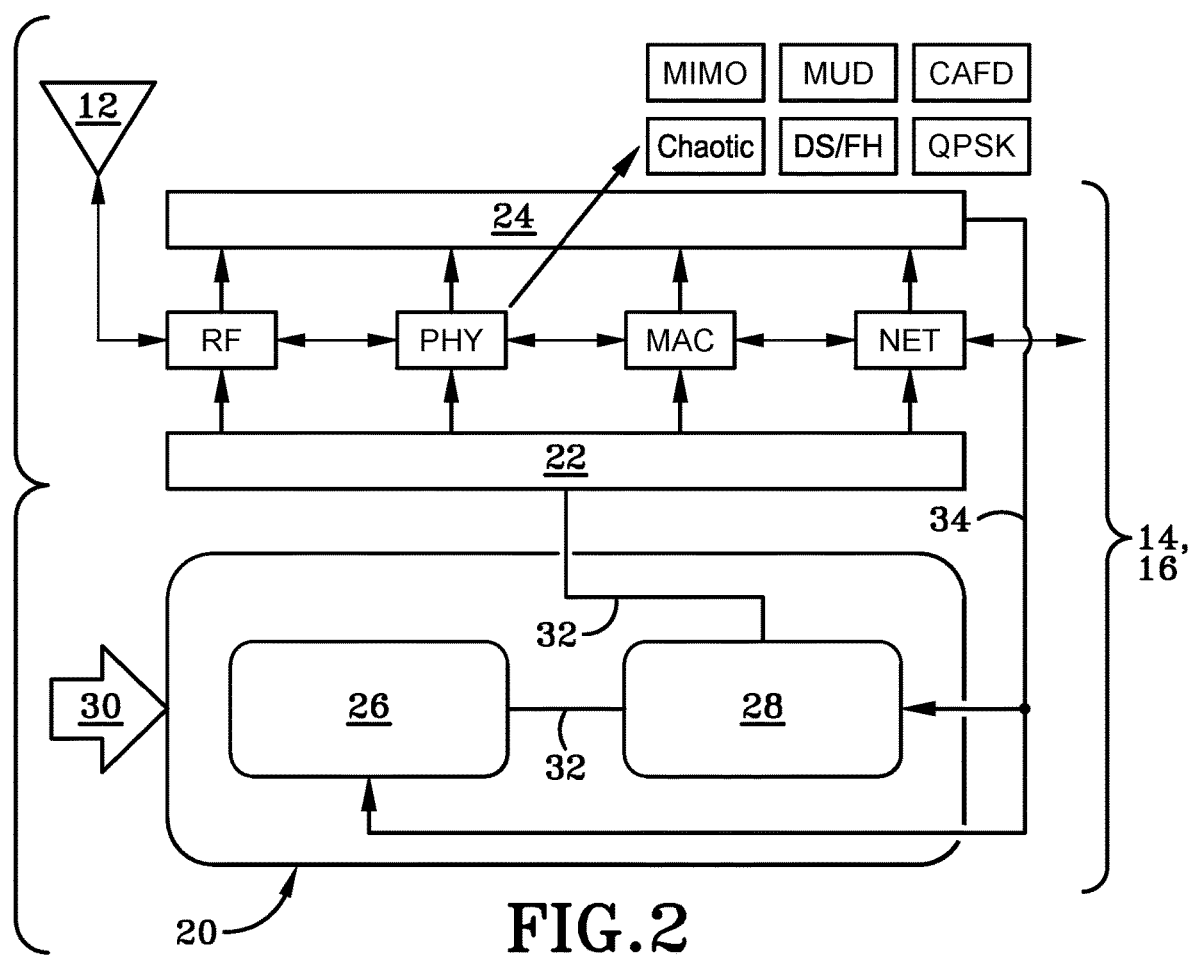
FIG. 2 is a block diagram view of a cognitive radio system according to one aspect of the present disclosure.

With reference to FIG. 2, the architecture of one embodiment of a radio system 10 according to the present disclosure is shown having a strategy optimizer component 20, a mitigation control plan component 22, and an interference recognizer component 24 which are shown as part of a block diagram relating to processor 16 and/or transceiver 14, as discussed herein. While each of these components, namely, strategy optimizer 20, mitigation control plan component 22 and interference recognizer 24 may vary depending upon the desired implementation, they will be understood to be described herein with reference to one embodiment and not as a limiting example of radio system 10 inasmuch as other components may be utilized or omitted as dictated by the desired implementation. The exemplary radio system 10 of FIG. 2 is shown and described as a "cognitive" radio system 10 in that the inclusion of the strategy optimizing component 20 may allow for system 10 to "reason" over a set of criteria (implemented as policy component 30) which may oversee or otherwise place proper limitations on the strategies and responses produced and utilized by radio system 10, as discussed below, to minimize the probability of detection, exploitation, or the like of system 10. According to another aspect, other, (non-cognitive) systems may be employed with the methods described herein.

According to the example set forth in FIG. 2, strategy optimizing component 20 (also referred to herein as strategy optimizer 20) of radio system 10 may further include a long term response engine 26 and a rapid response engine 28, which may be in communication with one another via one or more data connections 32 to allow strategies to be developed both utilizing long term data and utilizing time data collected during operation and use of radio system 10. Strategy optimizer 20, or more specifically, long term and short term response engines 26, 28 may be further connected to a mitigation control plan component 22 through one or more data connections 32. Both long term response engine 26 and rapid response engine 28 may be further connected to interference recognizer 24 by a performance feedback loop 34, which may facilitate real time adjustments or modifications to the radio system 10 during operation.

A variety of strategy optimizing components 20 can be used within this system 10. For example, the long term and short term response engines 26, 28 may be existing designs that may be adapted for use in strategy optimizing component 20. According to another aspect, long term and short term response engines 26, 28 may be adapted from existing designs or may be designed and built for a specific implementation, according to the desired parameters of such an implementation.

According to another aspect, other forms of machine intelligence including, but not limited to, a simple state machine could also be used in place of the strategy optimizer 20, or in place of specific components thereof. By way of one non-limiting example, a set of computations to determine allowed power transmission based on policy 30 and observables, such as the current location of platform 18, may be applied. This policy 30 may be based on known link length, for example, and an allowed data rate could be determined and applied with a simple state machine, or the like.

Strategy optimizer 20, or more particularly, long term and short term response engines 26, 28, may accept "observables" as provided by the interference recognizer 24 and interface to "controllables" such as provided by the mitigation component 22 to improve overall performance of the system 10, as discussed further herein.

As mentioned previously herein, it will be understood that the architecture of system 10 as depicted in FIG. 2 may be modified according to the desired implementation; however, the architecture may also operate similarly to legacy systems in that various components provided therein, including one or more of strategy optimizer 20, mitigation control plan component 22, and/or interference recognizer 24 may be legacy assets and/or may be used in connection with other legacy assets as dictated by the desired implementation.

As used herein to this point, LPD and LPE communications are defined by the waveform configuration based on mission needs, specifically, the waveform needs to have a low probability of detection or of exploitation; however, there are other waveform considerations that may differ according to specific mission parameters and/or mission objectives. These mission specific waveform configurations may be collectively thought of as a family of waveforms, with each configured for a different set of needs to meet a different set of goals. By way of some non-limiting examples, in addition to LPD and LPE, a mission may desire or require waveforms with a low probability of intercept, geolocation, recognition, jamming, spoofing, and/or breaking, or the like. Collectively, these waveform considerations and configurations may hereinafter be referred to as LPx, wherein x is understood to represent a variable waveform that can be adapted for multiple considerations. Accordingly, it will be further understood that LPx communications may include one or more of such waveform configurations, unless specifically stated otherwise.

Figure 3:
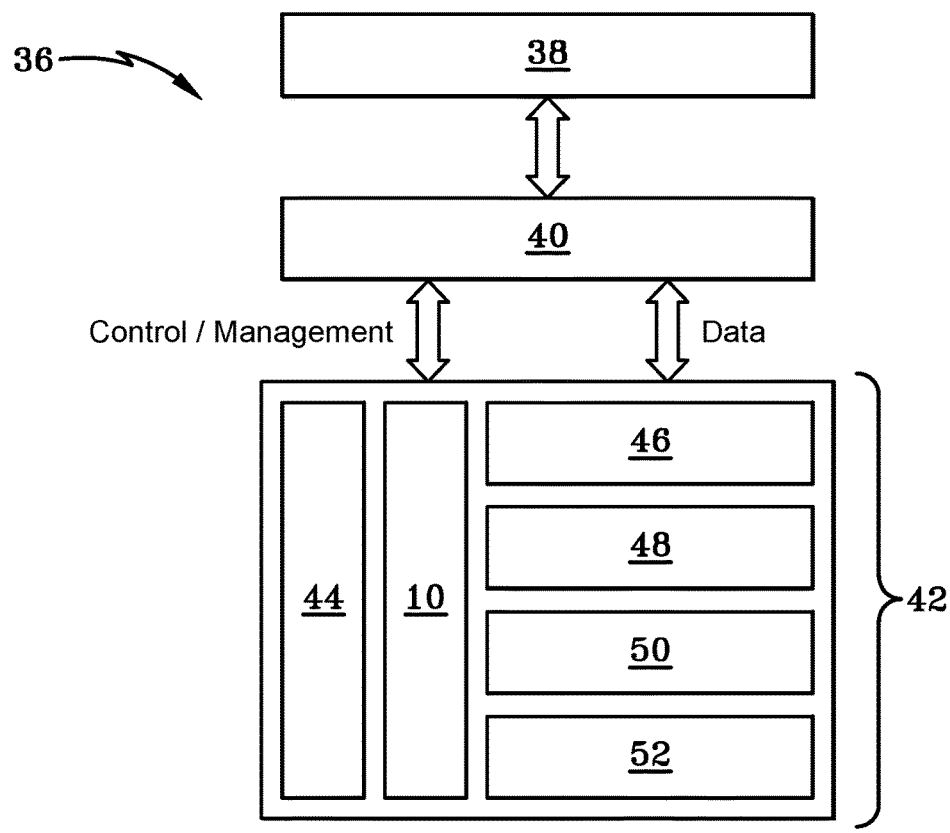
FIG. 3 is a block diagram view of a LPx communications system with modular open system architecture according to one aspect of the present disclosure.

With reference to FIG. 3, radio system 10 may be utilized as a component in a larger LPx communications system with modular open system architecture (MOSA), shown and generally referenced at 36 in FIG. 3. The architecture of LPx system 36 may include a gateway 38, an inter-network router (INR) 40, and a modular waveform stack 42 which may allow LPx system 36 to adapt to varying mission needs, including the accommodation and use of multiple differently configured waveforms, including non-LPx waveforms where desired. Cognition, as discussed above with respect to radio system 10, may be applied throughout LPx system, as dictated by the desired implementation through the inclusion of system 10 and/or similar cognitive components throughout the gateway 38, INR 40, and/or one or more waveform stacks 42.

Gateway 38 may be an intelligent gateway 38 which may be operable to provide a control interface to applications, mission managers, and external situational awareness components. Gateway may further be operable to negotiate quality of service between applications and network, ensure that communications components conform to mission policy, provide for information discovery and warehousing, support transcoding, and encrypting of information, as needed. Gateway 38 may use cognitive technologies to learn and adapt, and coordinate with other cognitive components in this architecture of the LPx system 36. Gateway 38 may be further operable to perform other desired functions as dictated by the specific implementation and/or specific mission needs. Accordingly, references to gateway 38 will therefore be understood to include any necessary components and elements therein to accomplish these tasks, or to accomplish any additional tasks assigned thereto according to the desired implementation.

INR 40 may be an intelligent inter-network router 40 which may be operable to provide heterogeneous MANET routing across available waveforms. INR 40 may be further operable to provide flow control and topology management, perform adaptation, and routing as needed across a waveform. INR 40 may coordinate activities closely to gateway 38 and may accept flow down of policy and situational awareness from gateway 38 interface (represented in FIG. 3 as the dual sided arrow between gateway 38 and INR 40). Similar to gateway 38, INR 40 may use cognitive technologies to coordinate between nodes and waveforms within the LPx system 36.

Waveform stack 42 may be a traditional open systems interconnection stack with a cognition component, such as radio management system 10 on the control and management plane. Other control and management plane components of waveform stack 42 may include a situational awareness component 44, while other components, including, but not necessarily limited to, networking 46, link/MAC 48, physical (PHY) layer 50, and RF including antenna 52 components may be layered on the data plane and may be red side or black side components, as dictated by the specific implementation. This may allow waveform stack 42 to map to a wide array of radio architecture, and may further provide that any layer may be removed and used within different waveform stacks, including within existing waveform stacks.

Waveform stack 42 may be operable to provide a "link" for the INR 40. Within a waveform, the waveform stack 42 may provide routing between waveform instances, scheduling of media access, framing, modulation, etc. Waveform stack 42 may likewise include cognitive learning and adaptation features that account for local sensing and situational awareness provided by other components, such as the situational awareness component 44. The waveform stack 42 is structured to accommodate integration of cryptographic functions (red/black) and may further allow for more limited awareness of the black side and integration of "inter-waveform" functionality.

Figure 4:
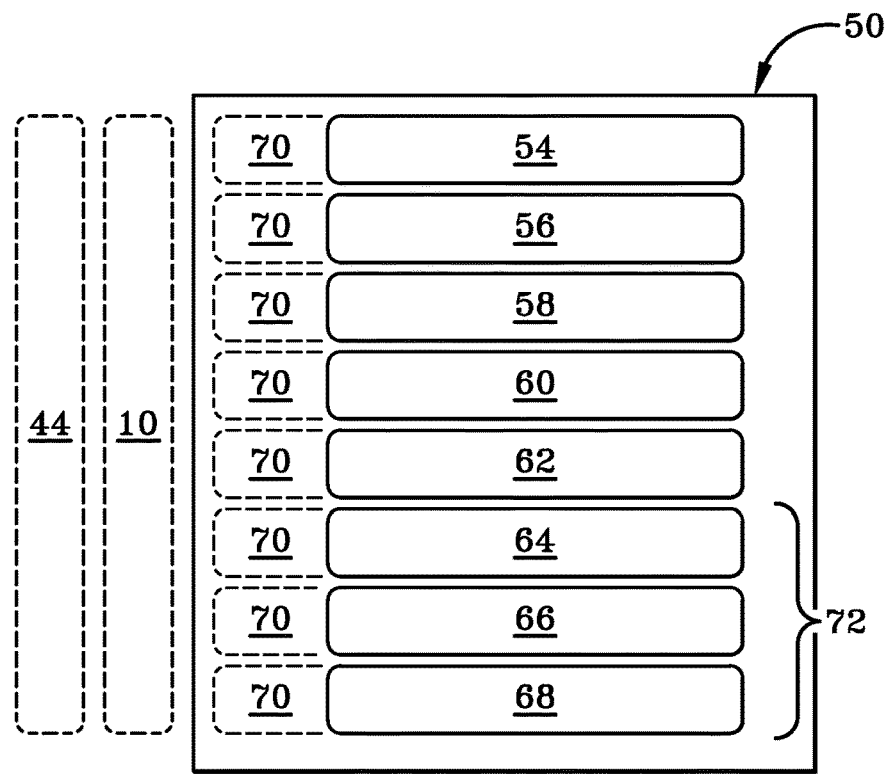
FIG. 4 is a block diagram view of the physical layer of the LPx communications system of FIG. 3 according to one aspect of the present disclosure.

With reference to FIG. 4, the PHY layer 50 may be functionally decomposed into several interdependent components including, but not limited to, framing 54, control signaling 56, packetization 58, error correction 60, interleaving 62, synchronization 64, modulation 66, and carrier generation 68. The PHY layer 50 may further include extensions 70 to one or more of the components which may be or include long term: multi-user (MU), multiple input-multiple output (MIMO), and/or directional networking (DN) technologies. As discussed further herein, the primary focus for LPx constraints may include the synchronization 64, modulation 66, and/or carrier generation 68 components. These components will be collectively referred to as LPx components 72, which will be understood to include all three identified components, unless specifically stated otherwise.

These components of PHY layer 50 are to be understood as exemplary components and may vary depending upon the desired implementation. According to one aspect, additional components may be included with the PHY layer 50. Alternatively, one or more of the PHY layer 50 components discussed herein may be omitted or replaced with other similar components, as desired As mentioned previously herein, it will be understood that the architecture of systems 10 and 36 as depicted and described may be modified according to the desired implementation; however, the architecture may also operate similarly to legacy systems in that various components provided therein may be legacy assets and/or may be used in connection with other legacy assets as dictated by the desired implementation.

Having thus generally described LPx system 36, the methods of generation and synchronization of a waveform may best be understood through discussion of these methods themselves. Accordingly, the elements and components of LPx system 36 will now be discussed with respect to their operation and function to further illustrate and understand the disclosed methods.

As a general concept, the goal for the disclosed waveform is to generate a LPx waveform that is not just LPD, but accounts for other constraints such as low probability of geolocation (LPG). Put another way, while it is extremely important to avoid detection, it is equally important in many situations to avoid the ability of adversarial units being able to geo-locate platform 18 using the transmitted signal. Put another way, if an adversarial force can't detect the presence of platform 18, they can't geo-locate the platform 18; however, if the adverse force does detect transmissions from platform 18, it is important that they cannot then use the detection of the transmissions to geo-locate platform 18. The architecture of LPx system 36 may allow for LPD or LPG waveforms (as well as other LPx waveforms) via flux density limits. It is therefore desirable to have the LPx characteristics of the disclosed waveform to appear as noise to adversarial detectors. Some high level ways to go about this may include transmission of two or more signals that spoof and/or cover each other, adjusting individual time and/or frequency components to appear to have different delays or different Doppler profiles, and/or limiting the total power and/or data rate of the transmitted signal based on energy detection thresholds based on the noise floor of the detector. Many of these will be discussed below.

There are many instances and scenarios in which a radio or communications equipment may be desirable to be operated in any environment, including contested or hostile environments. One such non-limiting example involves battlefield communication and/or coordination of units in a hostile environment. Accordingly, while it is understood that there are multiple applications for an LPx system 36 and/or radio system 10, the disclosure herein is described with contemplation towards such scenarios involving battlefield communications for the express purpose of simplicity and clarity in the disclosure. It will be therefore further understood that these are not limiting examples of use and operation the disclosed systems and methods but exemplary operations and use thereof.

Again, as previously described above, radio signals may be exploited by an adversarial force in a number of ways. First, radio signals may be detected by an enemy receiver and may be utilized to determine information as basic as the existence of units operating in a certain area, to more complicated information as to the type, size, direction, heading, velocity, and/or current location of these communicating units. Further, even secured communications run the risk of being intercepted if the signals are not also hidden or otherwise made difficult to detect or exploit in the first place.

Therefore, it is desirable to maintain these communications in a manner that provides LPx qualities depending upon the desired level of secrecy needed in that particular operation and/or for that particular unit. Despite the fact that enemies may be able to detect and/or utilize and exploit electromagnetic signals such as radio waves to their advantage, radio silence in a contested or hostile environment such as a battlefield is often unfeasible as there are certain information exchange requirements ("IER(s)") that must be communicated amongst units operating therein. For example, these IERs may include such information as targeting, information regarding friendly force location (otherwise known as blue force tracking), battle plans, action changes or reactive maneuvers, recon information, and the like. Often this involves two levels of communication. For example, a group of soldiers operating in a hostile area may be close together and thus may not require much bandwidth or power to talk amongst themselves, but there is a need to effectively communicate as a group to other units or persons who may be located further away, such as battlefield control or a mission commander. These remote units/persons may be located many miles or more from the troops operating and communicating the in environment. Communications to that effect require much higher power and increased bandwidth. By way of a simplified and non-limiting example, two individuals next to each other may communicate effectively by whispering, but to communicate with a person on the other side of a large field, they may need to shout. Relating this example to radio communications, the greater the distance separating the communicating parties, the "louder" the parties need to talk to effectively communicate. The tradeoff is that when power and/or bandwidth needs increase, the likelihood of a signal being detected and/or exploited by enemy units increases as well.

The present disclosure addresses ways of generating and receiving LPx communications that exploit inherent difficulties in receiver technologies to reduce the likelihood of signal detection and exploitation. One such application can involve the use of SFD limits to allow LPx system 36 to approximate SNR walls for known receivers which may then permit communications using signals that fall below the SNR wall. Thus, a signal operating below the SNR wall is likely to be viewed as noise and readily disregarded.

Once the SNR that a receiver requires to detect a signal is approximated, the receiver's noise figure and antenna gain can be obtained. With this information the SFD for any particular receiver may be calculated. The SFD essentially stands for the power density that may be used for communications without being detected by that receiver. In other words, SNR walls, noise, and antenna gain can be translated into SFD limits for each receiver and may therefore allow for LPx waveforms to operate below these limits while maintaining a high throughput and without curtailing battlefield communications.

Accordingly, the parameters of a chaotic LPx PHY 50 become important to maintain a signal status below the SNR wall and SFD limits. Accordingly, the parameters for an LPx PHY 50 include slot size, a preamble, data pulses, a start jitter, pulse gap, pulse width, allocated frequency, occupied bandwidth, frequency hopping, direct sequence minimum shift keying (DS-MSK), frequency shift keying (FSK), chaotic carrier binary phase shift keying (CC-BPSK), and chaotic carrier cyclic shift keying (CC-CSK). Using these parameters in combination (or variations of combinations of parameters) allows for a standard set of profiles to be determined on a pre-mission basis for each subnet. Each of these parameters will now be briefly discussed.

Slot Size—LPx may allow for a variable slot size, where slots are best understood as transmission opportunities and the waveform can accommodate multiple transmissions per each slot and also for overlapping slots. According to one example, an LPx waveform could have a slot size of 50 msec even though an existing overlaid waveform used 10 msec slots. LPx waveforms may further support simultaneous transmission in multiple overlaid slots.

Preamble—A number of dedicated synchronization pulses may be included at the front of the waveform. The only difference between sync and data pulses is that sync pulses have a known data value that facilitate time and frequency synchronization of the waveform as well as channel estimation. The preamble is optional, and preamble-less operation is supported by the LPx PHY 50.

Data—The LPx waveform supports a variable number of data pulses per slot. This may allow for different pulse structure (degrees of LPD), propagation delays, etc. According to one aspect, the data pulses may be defined to match with existing coding and interleaving schemes for existing LPx and non-LPx waveforms.

Start Jitter—To limit the impact of cognitive jammers, a uniform pseudo-randomly varied transmission start time (with max offset from slot boundary of a maximum jitter) may be used to avoid a system learning the slot structure. Long term cognitive jammers and signals intelligence (SIGINT) may be further confused by the overlapping of multiple slots.

Pulse Gap—A variable gap between pulses is permitted with the LPx waveform. A minimum fixed gap (which can be set to 0) may be determined with an additional uniform pseudorandomly generated variable gap portion with a max value determined by variance (as discussed below). The gap must be an integer number of samples.

Pulse Width—A variable pulse width is permitted in the LPx waveform. The width must be an integer number of samples. The minimum fixed width may be determined with an additional uniform pseudorandomly generated variable with portion with a max determined by variance.

Allocated Frequency—For purposes of the present disclosure, a single contiguous frequency band is assumed; however, the LPx waveform may accommodate keep outs, other spectrum management constraints, and awareness if desired according to the specific implementation.

Occupied Bandwidth—The "instantaneous" bandwidth of the pulse is tunable from a full allocated frequency bandwidth down to an arbitrary value consistent with pulse length.

Frequency Hops—If enabled, the LPX waveform is capable to automatically hop over the allocated bandwidth in uniform pseudorandomly generated increments consistent with the modulation and pulse width options selected.

DS-MSK—When combined with Frequency Hopping, DS-MSK can mimic most popular forms of LPD and anti-jamming communications available today. The DS-MSK as contemplated by the present disclosure may utilize a random spreading code with length determined by the pulse width parameters. The DS code may be modulated with cyclic shift keying (CSK) based on the symbol order. Thus, if the symbol order is set to 3, $2^3$ (8) cyclic shifts would be used to modulate data onto the DS carrier.

FSK—FSK mode does not require a linear PA, and is the most difficult to geo-locate. For each pulse, a single frequency carrier with uniform pseudorandomly generated start phase may be transmitted. The frequency transmitted may be determined by the parameter symbol order. If the symbol order was set to 3, one of 8 different frequencies would be used for each symbol. The tones may be equally spread so as to fully occupy the occupied bandwidth defined for the signal. When frequency hopping is enabled, the whole tone set is hopped across the available spectrum. This mode may use M-ary orthogonal modulation frequency shift keying to modulate a carrier.

CC-BPSK—This modulation is the most LPD of the modulations available as it has the least features. The chaotic carrier is a complex sequence of Gaussian variables of zero mean and unit variance. The number of samples in the sequence may be determined by the pulse width. The sequence is filtered to the occupied bandwidth, and then multiplied by +1 or −1 (Phase shift keyed) depending on the data value. For purposes of this disclosure, a symbol order of 1 is currently supported and coherent demodulation may be assumed.

CC-CSK—This modulation is less LPD than CC-BPSK but does not require coherent demodulation. The chaotic carrier is generated the same was as for CC-BPSK, but instead CSK (same as for DS-MSK) may be used to modulate the carrier.

According to one non-limiting example, a rateless CC-BPSK profile may have the following parameters:
- Slot Size—7.8125E-3 (seconds)
- Preamble—36 (pulses)
- Data—2048 (pulses)
- Start Jitter—1.0 E-4 (seconds)
- Pulse Gap=[0,0] (samples)
- Pulse Width=[896, 256] (samples)
- Allocated Frequency=250E6 (Hz)
- Occupied Bandwidth=250E6 (Hz)
- Frequency Hopping=0 (OFF)
- DS-MSK=[0,1] (Chaotic Carrier, BPSK)

Figure 5:
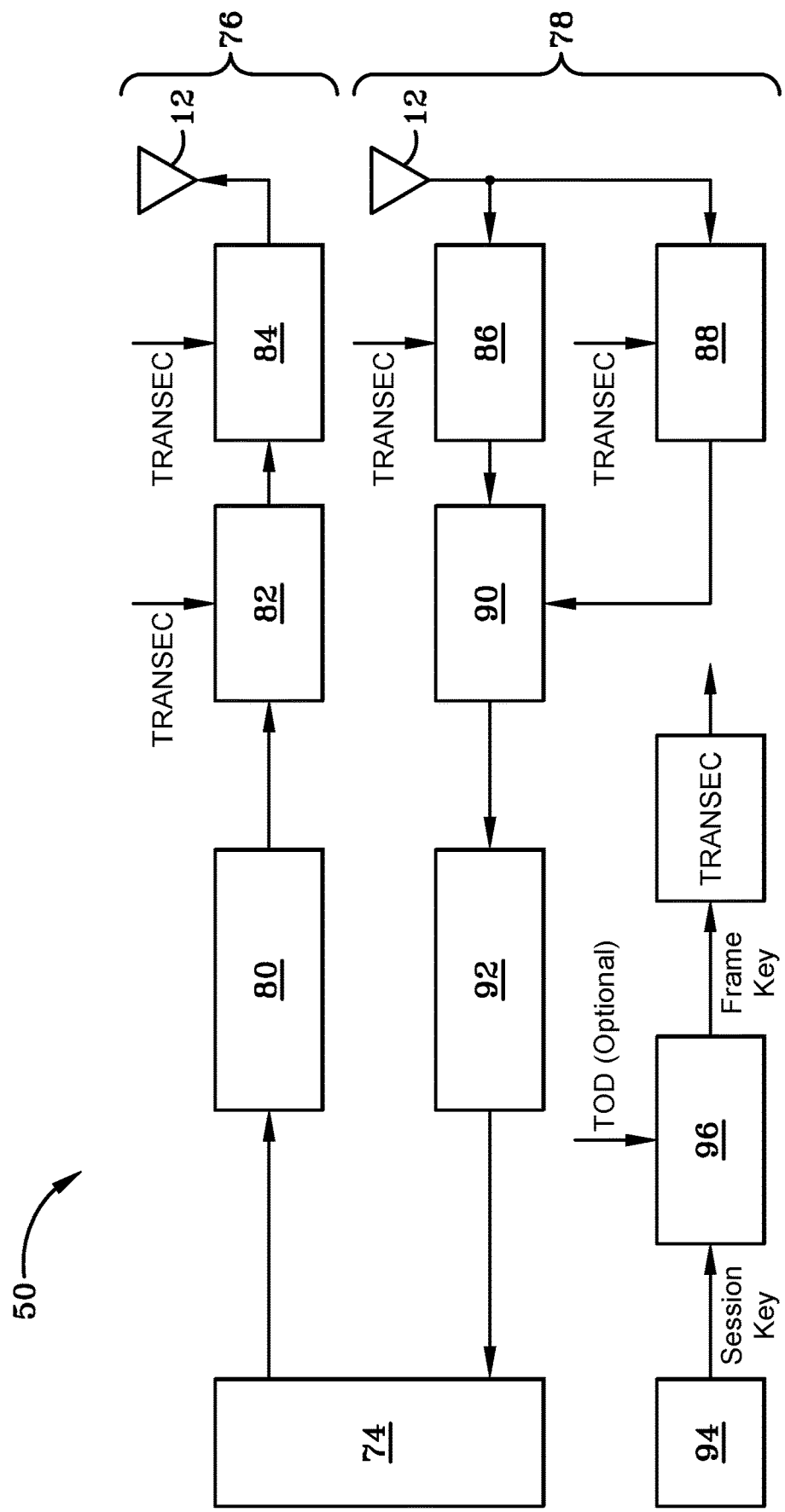
FIG. 5 is a block diagram view of an LPx chaotic physical layer according to one aspect of the present disclosure.

With reference now to FIG. 5, an exemplary block diagram of an LPx chaotic PHY 50 is shown having a data link layer 74 connecting to both the transmit plane 76 and the receiving plane 78. The transmit plane 76 may further include an error correction coding module 80, a sync insertion module 82, and a chaotic spreading module 84 between data link layer 74 and one or more transmit antennas 12. The receiving plane 76 may further include a de-spreading module 86, a sync detection module 88, a synchronization module 90, and an error correction decoding module 92 between one or more receiving antennas 12 and the data link layer 74. The LPx PHY 50 may further include a key store 94 and frame key generator 96.

As seen throughout FIG. 5 are transmission security (TRANSEC) bits which may be generated from key store 94 and frame key generator 96, as discussed below, and are applied at the synchronization and spreading modules 82, 84, 86, 88, and/or 90 in both the transmitting and receiving planes 76 and 78. Chaotic waveforms, as contemplated here, require a large number of random bits for each information bit. These random bits are the TRANSEC coded bits. One concern raised by this is the potential for key exhaustion, which is where a TRANSEC key, which allows for coding and decoding a signal, is used with enough bits as to reach the point of exhaustion. This point is where the key is no longer useful as enough TRANSEC bits have been exposed that it is considered vulnerable to exploitation. For TRANSEC key generation, it is common to use a random bit generator, such as AES-256, although any suitable random bit generator could be employed. Assuming frame keys are changed once per frame or slot, an AES-256 key would have approximately $2^{30}$ bits (i.e. uses) before it is exhausted. Assuming normal use with a chaotic waveform, one key could last on average four to six hours before reaching the point of exhaustion. Accordingly, for missions that are expected to come close to or exceed this time frame, additional keys are required. One solution may include using multiple random bit generators to produce session keys which can then be used to produce the frame keys. From there, the TRANSEC may be generated and applied to the outgoing or the incoming signals. According to one example, a first AES-256 (or any other suitable random bit generator) may generate one or more session keys which may be stored in key store 94. One session key at a time may then be delivered to the frame key generator 96 which may generate the frame key using a second AES-256 (or suitable alternative) random bit generator to produce the TRANSEC. Once a session key is exhausted, a new session key can be delivered from the key store 94 to the frame key generator 96 to allow continued operation.

If operating the LPx waveform below the SNR wall, for example in a range from (−20) to (−30) dB, enemy receivers will not be able to detect the signal, but with the correct TRANSEC, the signal can still be received and processed by the target unit. Further, the waveform may be configured according to the parameters discussed herein to optimize the signal according to the environment being operated in. For example, where a platform 18 is operating in an environment with a receiver that is a known distance away (the distance to intercept—Di) and the distance the platform 18 needs to transmit its signal (distance of communication—Dc), the waveform parameters may be adjusted or optimized to provide the Dc:Di ratio needed at that moment. LPx system 36 may accomplish this in real time through the use of cognitive reasoning, as discussed previously herein.

The chaotic waveforms generated by the LPx system 36 may be compatible with a variety of forward error correction (FEC) protocols, including, but not limited to, low density parity check (LDPC), Reed Solomon (RS), and repeat codes. Further, the disclosed method (discussed below) is contemplated to utilize a set of unmodulated pulses, for synchronization which may include a pilotless tracking loop to maintain synchronization, or may alternatively leave some Fast Fourier Transform (FFT) bins unmodulated as pilots for tracking.

The PHY 50 is thus chaotic as the carrier appears to be random noise, but is actually known by the transmitter (i.e. platform 18) and the receiver (e.g. the communications target platform) based on the frame key. Further, each pulse of the waveform may be bi-phase modulated (or bi-modulated) by flipping the phase 180° depending on whether a digital '1' or '0' is transmitted.

The PHY 50 may also generate transmission pulses having varying numbers of samples in each pulse. This permits the PHY 50 to be considered rateless. According to one example, a particular variance in pulse size may be chosen using a random number to determine the size of each pulse. For this example, assume a 10% variance of the average pulse size is used. Then, each pulse may vary in size (i.e. in number of samples) within that 10% variance which may result in a rateless waveform that is difficult to detect by rate detectors. The various sized pulses in a pulse train are able to be well bounded through the utilization of a simple algorithm. Specifically, if the current pulse is set to the smallest permissible pulse size (minus 10% from the average), a uniform random number may be generated and used to increase the intended variance. Then, the nominal pulse size for this first pulse may be equal to: the min. pulse size+variance/2. The random number may then be added to the current pulse size to get the final pulse size.

The next pulse is then set to the minimum pulse size and the variance of the previous pulse is subtracted therefrom. Then, the variance/2 is added to that result along with a new random number, up to the intended variance to get the size of the second pulse. This process may then be repeated for each subsequent pulse to keep the pulse train well bounded.

Having thus provided an overview of the waveform and of the methods of waveform generation and synchronization, the specifics of these methods will now be discussed.

Figure 6:
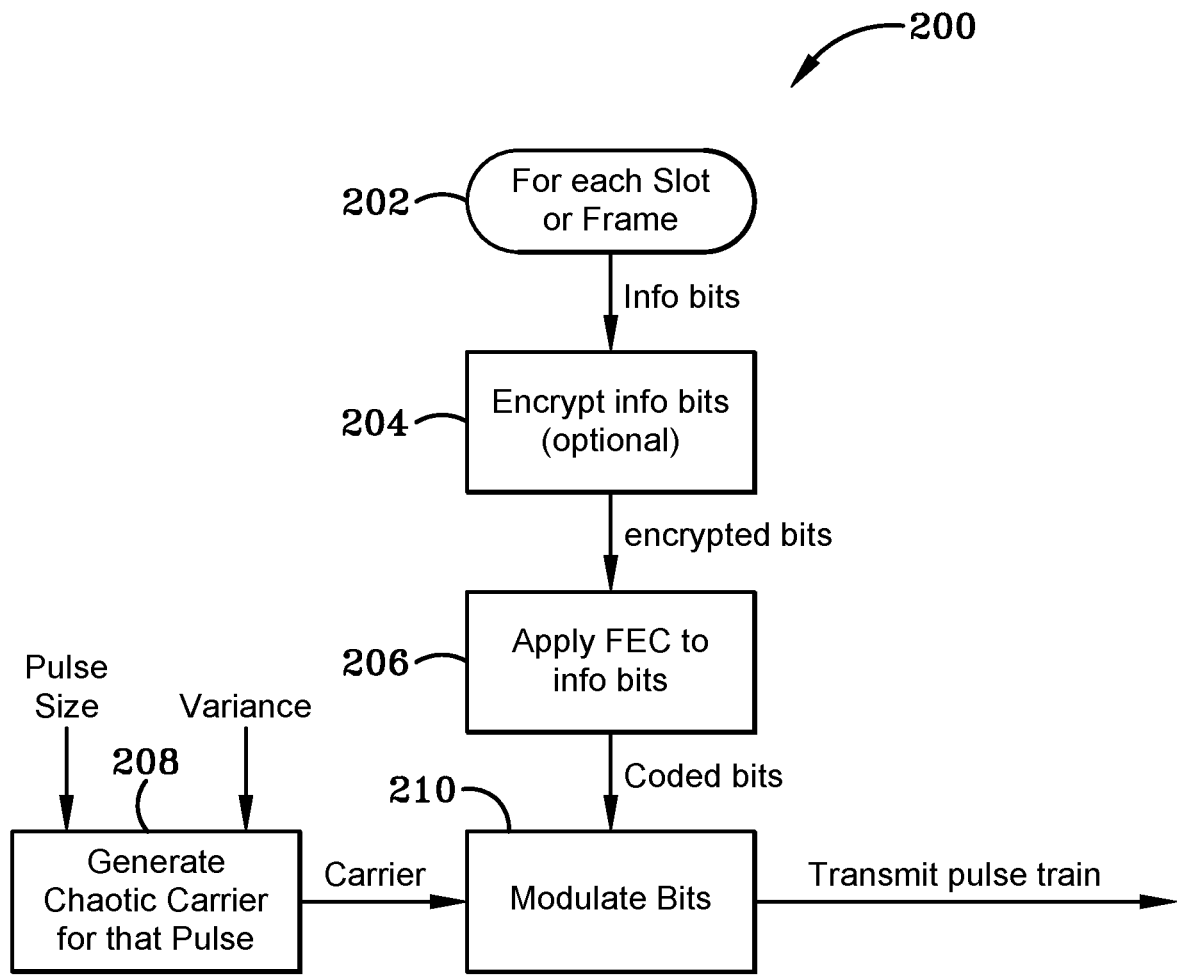
FIG. 6 is an exemplary flow chart illustrating a method of generating a chaotic waveform signal according to one aspect of the present disclosure.

With reference to FIG. 6, a process for generating a chaotic waveform with LPx properties is shown and generally referenced as process 200. For each slot or frame in the waveform, there are a number of information bits (info bits) which need to be accounted for. The accounting for info bits in each slot is shown as step 202 in process 200. From there, if desired, the info bits may be encrypted (shown as step 204) before applying FEC to each of the info bits using LDPC, RS, and/or repeat codes (or other suitable FEC protocols). The application of FEC to each info bit is shown at step 206.

Simultaneously, or in succession with, the application of FEC to the info bits, a pulse size and variance for that specific pulse may be determined and used, along with the aforementioned session and frame key, to generate the chaotic carrier for that pulse. The overall generation of the chaotic carrier is shown in process 200 as step 208 and is understood to represent the generation of the chaotic carrier for a single, representative pulse. The method for generating the chaotic carrier for a series of pulses is described below with reference to process 300 in FIG. 7.

Once the FEC is applied, the info bits are now coded and may progress through process 200 to modulation with the chaotic carrier in step 210, which may be accomplished using the previously discuss bi-phase modulation, or may be through any other suitable modulation protocol, as dictated by the desired implementation.

Once the coded info bits are modulated with the chaotic carrier, the signal may be transmitted.

Figure 7:
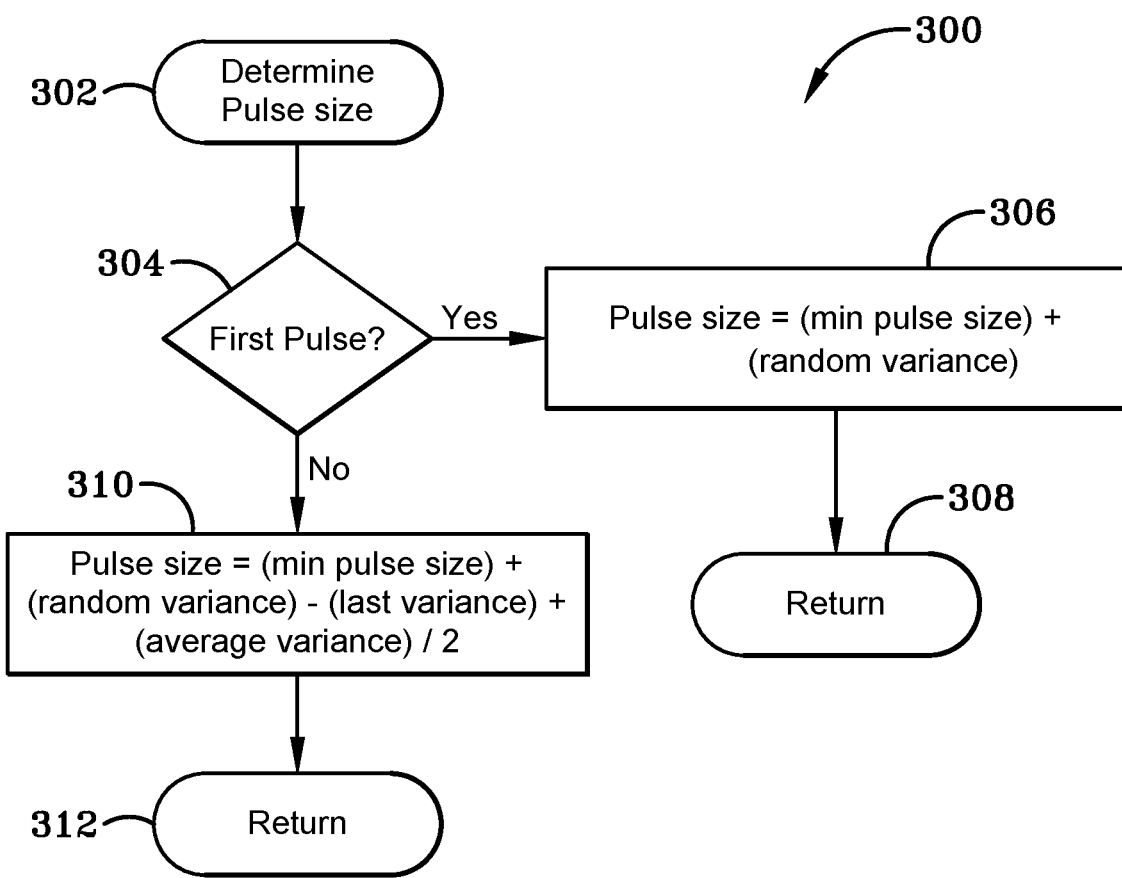
FIG. 7 is an exemplary flow chart illustrating a method of generating a chaotic carrier for the chaotic waveform from the process depicted in FIG. 6 according to one aspect of the present disclosure.

With reference now to FIG. 7, a method of generating the chaotic carrier for a series of pulses is shown and generally referenced as process 300. As discussed previously herein, process 300 is recognized as the process of generating a chaotic carrier for a series of pulses which is performed during step 208 of process 200. Specifically, each pulse of a pulse train will go through process 200, including step 208 wherein a chaotic carrier is generated for each pulse. Every time a chaotic carrier is generated, process 300 is employed during that step.

Accordingly, process 300 first begins with a determination of the pulse size for the specific pulse within a pulse train. This determination is shown as step 302. Next in process 300 is a determination of which pulse within a pulse train is receiving a generated chaotic carrier. More particularly, the determination is whether the present pulse is the first pulse of the pulse train. This determination is made as step 304.

If the pulse is determined to be the first pulse of the train in step 304, the pulse size is calculated according to step 306 as the (minimum pulse size)+(random variance), as discussed previously herein. From there, the chaotic carrier for the first pulse is generated and may then be modulated with the coded info bits in step 210 of process 200. The return (e.g. sending) of the chaotic carrier for the first pulse in a train is shown as step 308.

If the pulse is determined not to be the first pulse of the train in step 304, the pulse size is calculated according to step 310 as the (minimum pulse size)+(random variance)—(last variance)+(average variance)/2, as discussed previously herein. From there, the chaotic carrier for each subsequent pulse is generated and may then be modulated with the coded info bits in step 210 of process 200. The return (e.g. sending) of the chaotic carrier for each subsequent pulse in the train is shown as step 312 in process 300.

Processes 200 and 300 relate to a rateless chaotic physical layer utilizing pulse size variation methods which are useful in LPx communications for the reasons described above. It will be understood that additional waveform manipulations may likewise be useful or beneficial in LPx communications.

According to one non-limiting example, a noise only channel with no variation of the sync or pulse size may be used to generate a chaotic carrier which may start with uniformly sized pulses and uniform and Rayleigh distributed random variables. The unform variables are used to generate the phase values of the individual sine and cosine (I,Q) components of the chaotic charrier both of which are then multiplied by a common Reighley distributed variable. With uniform variables, the phases should have a uniform distribution and be equally likely; however, using the sine and cosign functions with the Rayleigh amplitude variable will result in a Gaussian distribution (assuming two 8-bit numbers i and q). This process may be performed utilizing FFT bins in the frequency domain. A discrete Fourier transform (DFT) may be employed to define the chaotic pulse where the lowest DFT bins, and other bins if desired, may be set to zero. A Rayleigh amplitude variable multiplied times a complex sinusoid generated using a uniform phase distribution variable can be used to populate non-zero bins. A time domain sequence can be generated using an inverse DFT to generate the time domain pules which is then bi-phase modulated without varying the pulse width of the signal. This approach may be further scaled to remain below the SNR wall given the specifics of a known detector for effective LPx communications.

According to another example, the noise only approach may be combined with variable pulse width to achieve similar or improved results.

Generating and transmitting an LPx signal is important and useful in battlefield communications and in other instances where detection and exploitation of a transmitted signal is not desirable; however, the generation of such a signal requires that the communications target is capable of receiving and understanding the data transmitted. Put another way, even if a "perfect" signal is transmitted that no detector can find, if the target receiver cannot effectively receive and translate that signal, it is useless in communications. Accordingly, LPx signals necessarily need to be properly synchronized with the target signal receivers.

While the synchronization techniques described herein are contemplated for use with LPx signals, such as the wideband, featureless, rateless, chaotic waveform described above, it will be understood that these synchronization techniques may be used with and equally apply to other waveforms including LPx and non-LPx waveforms alike. For purposes of simplicity and clarity in this disclosure, the techniques will be discussed with reference to the chaotic waveforms taught herein but it will be understood that the disclosure herein will apply to all waveforms and waveform types unless specifically stated otherwise.

An ideal chaotic signal is one that is wideband and is designed to appear as noise. Wideband, as used herein, is defined as a signal with a bandwidth that is more than 10% of the center frequency, while ultra-wideband is a signal with a bandwidth greater than 25% of the center frequency. For example, a 250 MHz signal centered at 1 GHz would be ultra-wideband under this definition.

If ideally designed and executed, a chaotic wideband or ultra-wideband signal would appear as noise, which would essentially classify the signal as arbitrary, which, as used herein is defined as a signal where one or both of the coding and modulation used are not known. Countering channel effects of an arbitrary signal in synchronizing signals is difficult at best and requires accounting for one or more of timing offsets, frequency offsets, Doppler effects, and/or multipath. Thus, a solution that allows for synchronization of an arbitrary signal, such as a wideband or ultra-wideband chaotic signal, would work equally well to synchronize other, less complex signals.

Typical synchronization techniques tend to fall into one of three fundamental approaches. First, there is a synchronization preamble and/or midamble which are a period of time where the transmitted signal is fully known. Next, there are approaches that utilize "pilot" tones, which are a set of frequencies (subbands) where the transmitted signal is again fully known. A third technique is the use of data aiding which uses a modulated signal, but estimated data values are fed back to the receiver so that the transmitted signal can be estimated. Most current systems use one or more of these approaches, with many using more than one.

The present disclosure relates to a set of techniques that are based on these three fundamental concepts and are tailored to an arbitrary signal, such as the previously described chaotic waveform. This tailored approach may utilize receivers that presumes knowledge of transmitted sample values, but does not presume knowledge of underlying physical layer operations such as modulation and/or coding.

According to one aspect, a present system of synchronization techniques may be operable using both directional and/or omni-directional antennas, would support time-domain multiple access (TDMA) systems while also considering frequency domain processing. Accordingly, disclosed herein is a framework to handle synchronization for signals with an arbitrary, or unknown, modulation and coding scheme.

Figure 8:
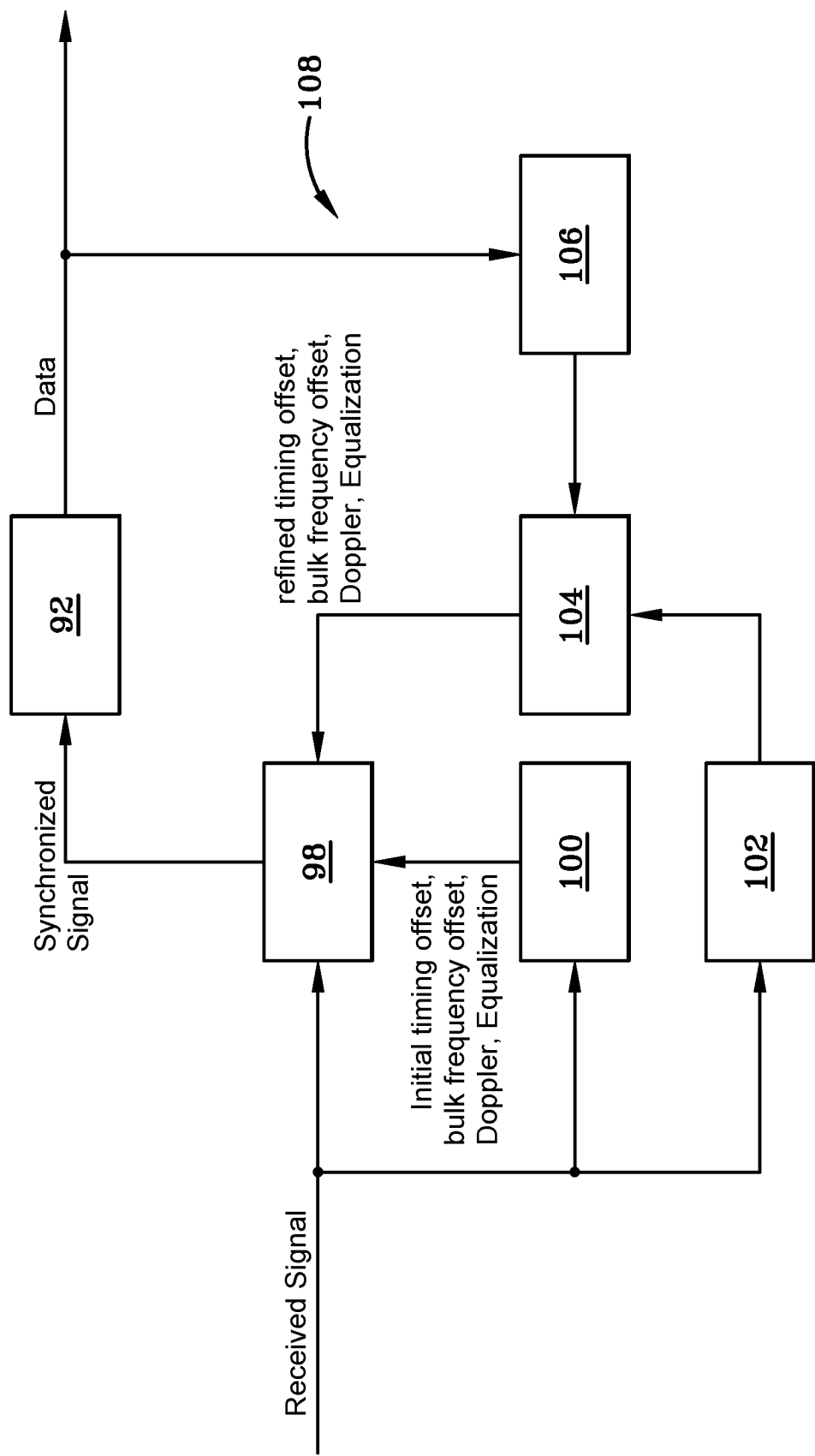
FIG. 8 is a block diagram view of a receiving unit of an LPx communications system according to one aspect of the present disclosure.

With reference to FIG. 8, the framework of a receiver system is shown in a block diagram format having a synchronizer 98, a preamble detection module 100, a delay module 102, and a channel estimator 104. This receiver system is contemplated to be used within the PHY 50 framework (seen in FIG. 5) or separately as a standalone system which may be paired (i.e. operable) with LPx system 36 or with any other suitable transmitter system. According to one aspect, this receiver system may further include a demodulator and decoder, such as the error correction decoder 92 of PHY 50, and a reference generator 106. The decoder may be decoder 92 of PHY 50 or may alternatively be any other suitable decoder as dictated by the desired implementation. Reference generator 106 may further form a feedback loop 108, as discussed below.

The receiver system of FIG. 8 may be understood to represent a generalized example and is not a limiting example thereof. Instead, the general concept illustrated is that an incoming signal, including a preamble when TDMA is employed, is received and simultaneously directed to the synchronizer 98, the preamble detection module 100, and the delay module 102. The preamble detection module 100 may then feed into the synchronizer 98 while the delay module may feed to the channel estimator 104 before ultimately feeding into the synchronizer 98. From there, the synchronized signal may be delivered to the decoder 92 which may then direct the decoded signal data to the data link layer (e.g. data link layer 74 of PHY 50) while simultaneously being fed back into the reference generator 106 and back into the channel estimator 104 via feedback loop 108.

Further according to this aspect, the received signal is delivered to the synchronizer 98 in three conditions/ways. First, it is delivered as received directly from the receiving antenna. Second, the signal may pass through the preamble detection module 100 which may deliver an initial timing offset, bulk frequency offset, Doppler, and/or equalization to the synchronizer. A third path may direct the signal through the delay module 102 and the channel estimator 104 which may deliver a set of refined data relating to the timing offset, bulk frequency offset, Doppler, and/or equalization which is further refined through reference generator 106 and feedback loop 108 utilizing decoded signal data to enhance the refinement of incoming signal pulses.

Each of the signal impairments, namely, the timing offset, bulk frequency offset, Doppler, and/or equalization act to distort the transmitted signal in some way, which may generally impact the amplitude, delay, or phase/frequency of a signal component. If the phase of the signal is coherent, more powerful signal processing may be used as the phase relationships are maintained by the signal after passing through the channel estimator 104, thus leading to improved detection accuracy. If the phase of the signal is non-coherent, less effective, but still viable solutions may be employed by focusing on the amplitude rather than the phase to detect the signal.

According to one aspect, one way to address non-coherent signals is to deconstruct the signal into time frequency tiles, or bins. In doing so, phase relationships may be preserved to a higher level of fidelity which may allow coherent detection techniques to be used within each time; however, between differing tiles, these phase relationships are not preserved so non-coherent detection may still be applied.

Figure 9:
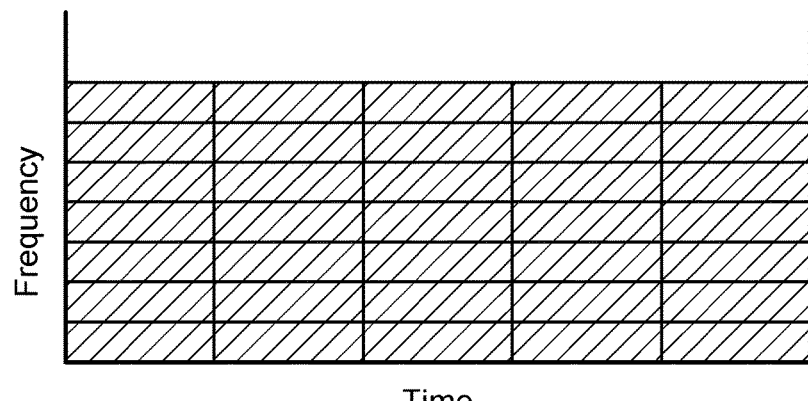
FIG. 9 is an exemplary graphical view of a series of coherence domains according to one aspect of the present disclosure.

With reference then to FIG. 9, the processing of a non-coherent signal may utilize FFT to break the processing into several "coherence domains" which may accept maximum uncompensated Doppler. This approach assumes the effects of multipath are constant or relatively constant within each domain which then allows for coherent processing within each domain while still permitting non-coherent processing to be used between domains. As shown in FIG. 9, FFT bins may be established in both time and frequency constraints with each set of adjacent bins representing a frequency "domain." These FFT bins may have a frequency extent determined by the sampling rate of the signal, thus this technique assumes at least a portion of the transmitted signal is known (e.g. a reference signal exists). Accordingly, the reference signal can be expressed as "chunks" in both time and frequency.

Figure 10:
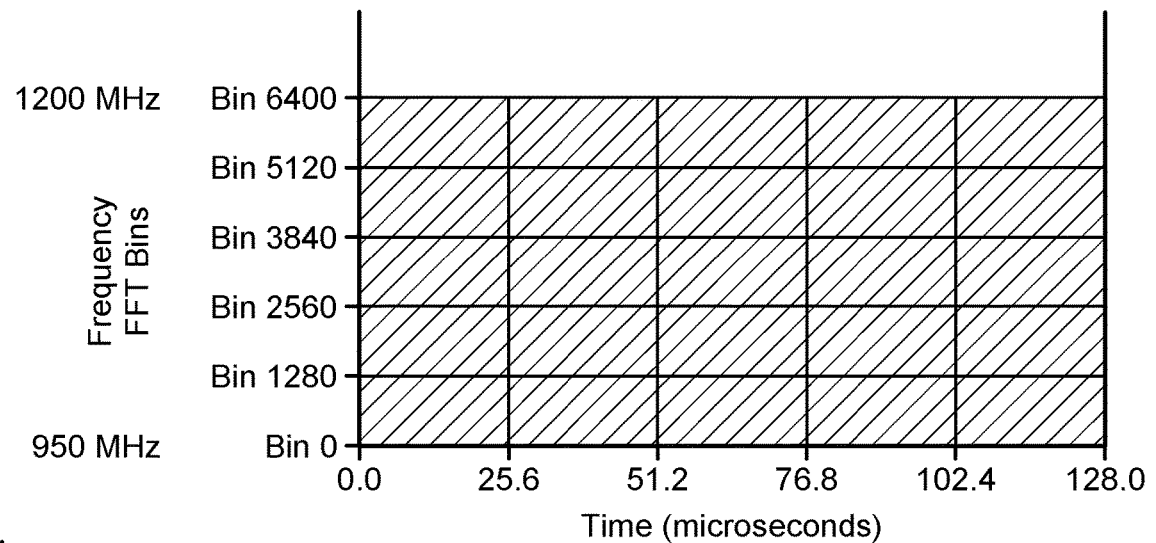
FIG. 10 is a second exemplary graphical view of the series of coherence domains of FIG. 9 according to one aspect of the present disclosure.

With continued reference to FIG. 9 and further reference to FIG. 10, in order to set up these domains in the time constraint, first the highest Doppler frequency of concern should be determined based on maximum uncompensated velocity between the transmitter and the receiver. If the Doppler of the signal is known, then Doppler compensation may be used prior to processing. According to one non-limiting example, if the Doppler has a 1600 m/sec maximum, then the Doppler at 950 MHz is approximately equal to 5 KHz and at 1200 MHz is approximately equal to 10 KHz. Next, a limit is placed on the amount of permissible drift within a domain. Typically, the drift within a domain should less than 180°. For purposes of this example, assuming a drift limit of 90° provides that at the maximum Doppler (i.e. 10 KHz), the signal has a period of 100 microseconds. Then, the domains are further limited to approximately one quarter, thus each time domain is approximately 25 microseconds wide.

Next, the domains can be set using the frequency constraints as the frequency bin size and FFT time extent are interrelated. First, reconsidering the maximum Doppler frequency offset, it is desirable to have bins that are greater than that value by some degree. For example, typical values may be ¼ or 1/10 of the bin size; however, any value less than the drift limit may be used as dictated by the desired constraints and implementation. Thus, using 1/10 and keeping with the example above then provides that each frequency bin should be at least 100 KHz wide before taking the phase difference between bins into account. In order to obtain a coherent correlation across bins, the relative Doppler offset must be relatively small. According to one non-limiting example, if it is desired to have a less than 10° Doppler skew between the top and bottom bins in a domain, the useful values are likely between 1° and 45°. Thus, if our coherence time bins are 25 microseconds wide, our maximum phase drift is 90° at 1200 MHz, and our minimum phase drift is 45° at 950 MHz, the difference across the frequency band is 45° (90°–45°) which leads to 4.5 frequency domains to keep the skew to 10° or less, which can be rounded to 5 to further ensure the skew is below the desired maximum.

As mentioned above, frequency bin size and FFT time extent are interrelated, so it is important to reconsider the Doppler offset to bin size frequency constraint in view of the maximum time domain constraint. Keeping with the presented example and assuming a 320 MHz sample rate, the samples in the FFT bins should be no more than 32000, which results in the previously discussed 100 KHz wide frequency bins; however 32000 samples in the FFT results in a time extent of 100 microseconds, which is too large, so the samples are limited to ¼ of that, or approximately 8000 samples, to meet both the 25 microsecond time constraint and the Doppler to bin size offset constraint.

Now, with knowledge of the frequency and time constraints, the FFT size may be selected, which should be closest to the desired number of samples. In this example, and FFT size of 8192 would be the closest to the 8000 samples that are desired and is efficient to implement. Given this, the FFT frame size is 25.6 microseconds which is close enough in proximity to the approximately 25 microsecond time constraint and our frequency bin size is 39.0625 KHz. Accordingly, with 250 MHz occupying 6400 bins, each of our desired 5 coherence domains would each contain 1280 bins, as best illustrated in FIG. 10.

Now, with our coherence domains set up, the method of synchronization using these coherence domains will be provided by way of a non-limiting example. For purposes of this example, assume an arbitrary chaotic signal with transmitted sample values at certain times and frequencies that are well defined. According to one example, these known values may be a TDMA preamble which may be used to synchronize the unknown content in the signal. Once these unknown components are then estimated using the known values, the synchronization of the signal can be continuously updated through employment of feedback loop 108 in a real-time, on-going basis. This example may further provide that synchronization parameters within coherence domains are estimated using coherent processing, while parameters between domains are estimated using non-coherent processing techniques.

The first step in the present coarse synchronization method is to detect and isolate the preamble in the received signal. This can provide a focus point for a more detailed channel estimation. Next, a series of bulk correlations can be performed by multiplying two signals in the frequency domain and then performing an inverse FFT, which can compute correlations over multiple time shifts. The inverse FFT is best performed with coherent processing techniques.

From the preamble, time frequency reference tiles of size approximately equal to the size of the coherence domains can be created, with some tiles "padded" with zeros to permit bulk searches for the preamble with a larger FFT. Once the time frequency tiles are created, the FFT may be applied thereto.

Additionally, the time frequency tiles may be further divided by frequency to create the coherence domains, as discussed above. All bins that do not fall into a given coherence domain can be zeroed and a series of bulk correlations can be performed on the received signal using coherent processing techniques within domains and non-coherent techniques between domains, with magnitude added to the non-coherent techniques.

There exists a presumption that overlapped FFTs may be less complex than performing a bulk correlation. Accordingly, in another example, the reference signal (i.e. the known preamble) can be broken into time-frequency chunks with time blocks and frequency blocks. Prior then to transform, the time blocks can be padded with zeroes to increase their extent. Then, the FFT of the padded signal can be taken and then further broken into frequency chunks.

Then, the received signal can be further analyzed for the preamble by correlating with each of the individual chunks by taking a chunk of the received signal, transforming it with an FFT, and then multiplying it with the reference signals in the frequency domain. An inverse FFT may be performed to find the time series correlation of each chunk of the received signal. These correlations can be time aligned and can have their powers summed before doing a peak detection. In this instance, some overlap between the signal chunks may provide some assurance that the preamble is not missed if it is divided between two chunks.

These steps may provide a coarse synchronization of the received signal which may be refined through re-using estimations from the signal via feedback loop 108.

As described herein and mentioned above, the methods of waveform generation and signal processing address specific needs relating to LPx communications and are implemented using the described systems or other suitable systems, as dictated by the desired implementation. These methods increase the reliability, efficiency, speed, and cost parameters of LPx communications while maintaining low probability of detection and/or exploitation of the signals described herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of waveform synchronization comprising:
receiving a signal via at least one antenna and at least one receiver, the signal having a known preamble and wherein the data used in generating the signal are not known except for the data symbols in the preamble;
creating a plurality of coherence domains using time and frequency constraints to accept maximum uncompensated Doppler values;
establishing a plurality of FFT bins in each of plurality of coherence domains;
performing a series of bulk correlations on the received signal by multiplying the received signals with a reference signal derived from the known preamble in the frequency domain and applying an inverse fast Fourier transform (FFT) to the result to estimate the correlation values at points in time;
detecting and isolating the preamble of the received signal;
estimating the synchronization values of the received signal within the coherence domains based on the known preamble;
estimating the synchronization values of the received signal between coherence domains based on the known preamble; and
updating the synchronization values of the received signal on an ongoing and real time basis using the estimated synchronization values from the detected signal from a post processing feedback loop.

2. The method of claim 1 wherein estimating the synchronization values of the received signal within coherence domains is performed using coherent processing techniques.

3. The method of claim 2 wherein estimating the synchronization values of the received signal between coherence domains is performed using non-coherent processing techniques.

4. The method of claim 1 wherein creating the plurality of coherence domains further comprises:
calculating a size constraint in the time domain based the highest Doppler frequency of concern determined from a maximum uncompensated velocity between a transmitter generating the detected signal and the receiver.

5. The method of claim 4 wherein the value of the size constraint in the time domain is approximately one quarter of a period of the highest Doppler frequency of concern.

6. The method of claim 4 wherein creating the plurality of coherence domains further comprises:
calculating a size constraint in the frequency domain based on a maximum Doppler frequency offset that is less than the FFT bin size determined by a drift limit of less than 180°; and
calculating the number of coherence domains required to keep a Doppler skew below 10°.

7. The method of claim 6 wherein the size constraint in the frequency domain is approximately one tenth of the FFT bin size determined by the drift limit.

8. The method of claim 6 wherein creating the plurality of coherence domains further comprises:
  calculating a number of signal samples to be taken per bin based on the smaller of the size constraint in the time domain and the size constraint in the frequency domain; and
  sampling the signal.

9. The method of claim 8 wherein establishing the plurality of FFT bins further comprises:
  selecting an FFT size closest to the number of samples per bin; and
  determining the number of bins per coherence domain.

10. A method of secure communications within an environment comprising:
  generating a communications signal with at least a portion of the signal being known and at least a portion of the signal being unknown;
  transmitting the communications signal from a first platform via at least one antenna in operable communication with at least one transmitter;
  receiving the communications signal with a second platform via at least one antenna in operable communication with at least one receiver;
  creating a plurality of coherence domains using time and frequency constraints to accept maximum uncompensated Doppler values;
  establishing a plurality of FFT bins in each of plurality of coherence domains;
  estimating the synchronization values of the communications signal within the coherence domains based on the known portion of the communications signal;
  estimating the synchronization values of the received signal between coherence domains based the known portion of the communications signal; and
  updating the synchronization values of the communications signal on an ongoing and real time basis using the estimated synchronization values from the detected signal from a post processing feedback loop.

11. The method of claim 10 wherein estimating the synchronization values of the received signal within coherence domains is performed using coherent processing techniques.

12. The method of claim 11 wherein estimating the synchronization values of the received signal between coherence domains is performed using non-coherent processing techniques.

13. The method of claim 10 wherein creating the plurality of coherence domains further comprises:
  calculating a size constraint in the time domain based the highest Doppler frequency of concern determined from a maximum uncompensated velocity between the first platform and the second platform.

14. The method of claim 13 wherein the value of the size constraint in the time domain is approximately one quarter of a period of the highest Doppler frequency of concern.

15. The method of claim 13 wherein creating the plurality of coherence domains further comprises:
  calculating a size constraint in the frequency domain based on a maximum Doppler frequency offset that is less than the FFT bin size determined by a drift limit of less than 180°; and
  calculating the number of coherence domains required to keep a Doppler skew below 10°.

16. The method of claim 15 wherein the size constraint in the frequency domain is approximately one tenth of the FFT bin size determined by the drift limit.

17. The method of claim 15 wherein creating the plurality of coherence domains further comprises:
  calculating a number of signal samples to be taken per bin based on the smaller of the size constraint in the time domain and the size constraint in the frequency domain; and
  sampling the signal.

18. The method of claim 17 wherein establishing the plurality of FFT bins further comprises:
  selecting an FFT size closest to the number of samples per bin; and
  determining the number of bins per coherence domain.

19. A system comprising:
  at least one antenna;
  at least one receiver in operable communication with the at least one antenna, the at least one antenna and at least one receiver operable to receive and transmit electromagnetic signals;
  at least one processor capable of executing logical functions in communication with the at least one antenna and at least one receiver; and
  at least one non-transitory computer readable storage medium having instructions encoded thereon that, when executed by the processor, implements operations to generate a waveform, the instructions including:
  receive a signal via the at least one antenna and the at least one receiver, the signal having a known preamble and wherein the data used in generating the signal are not known except for the data symbols in the preamble;
  create a plurality of coherence domains using time and frequency constraints to accept maximum uncompensated Doppler values;
  establish a plurality of FFT bins in each of plurality of coherence domains;
  perform a series of bulk correlations on the received signal by multiplying the received signals with a reference signal derived from the known preamble in the frequency domain and applying an inverse fast Fourier transform (FFT) to the result to estimate the correlation values at points in time;
  detect and isolate the preamble of the received signal;
  estimate the synchronization values of the received signal within the coherence domains based on the known preamble;
  estimate the synchronization values of the received signal between coherence domains based on the known preamble; and
  update the synchronization values of the received signal on an ongoing and real time basis using the estimated synchronization values from the detected signal from a post processing feedback loop.

* * * * *